June 10, 1924.
H. PARKER
1,497,344
MACHINE FOR MANUFACTURING TUBES AND OTHER HOLLOW BODIES FROM PULP
Filed Dec. 3, 1915    7 Sheets-Sheet 1
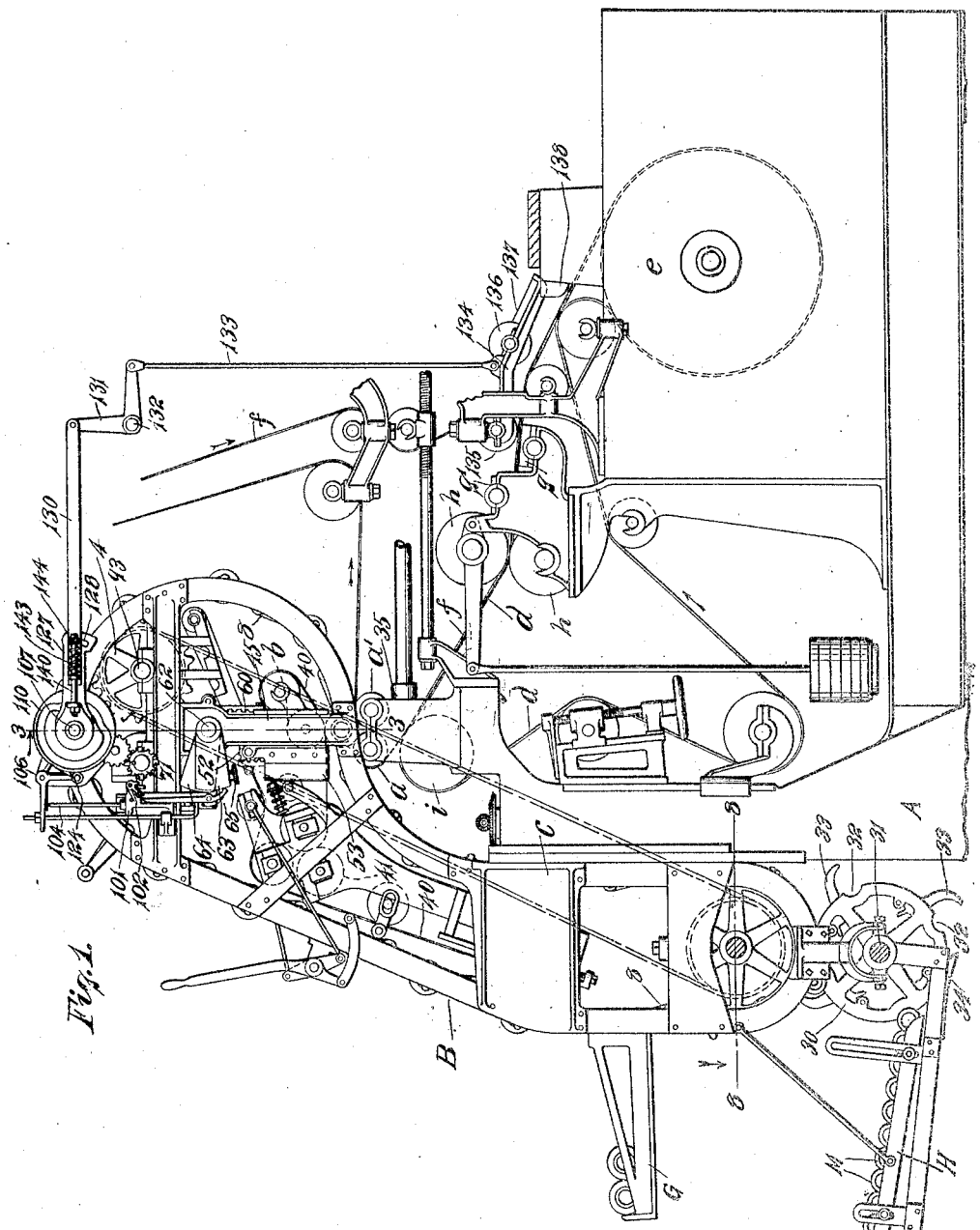
INVENTOR.
Howard Parker:
BY
H. E. Hart
his ATTORNEY.

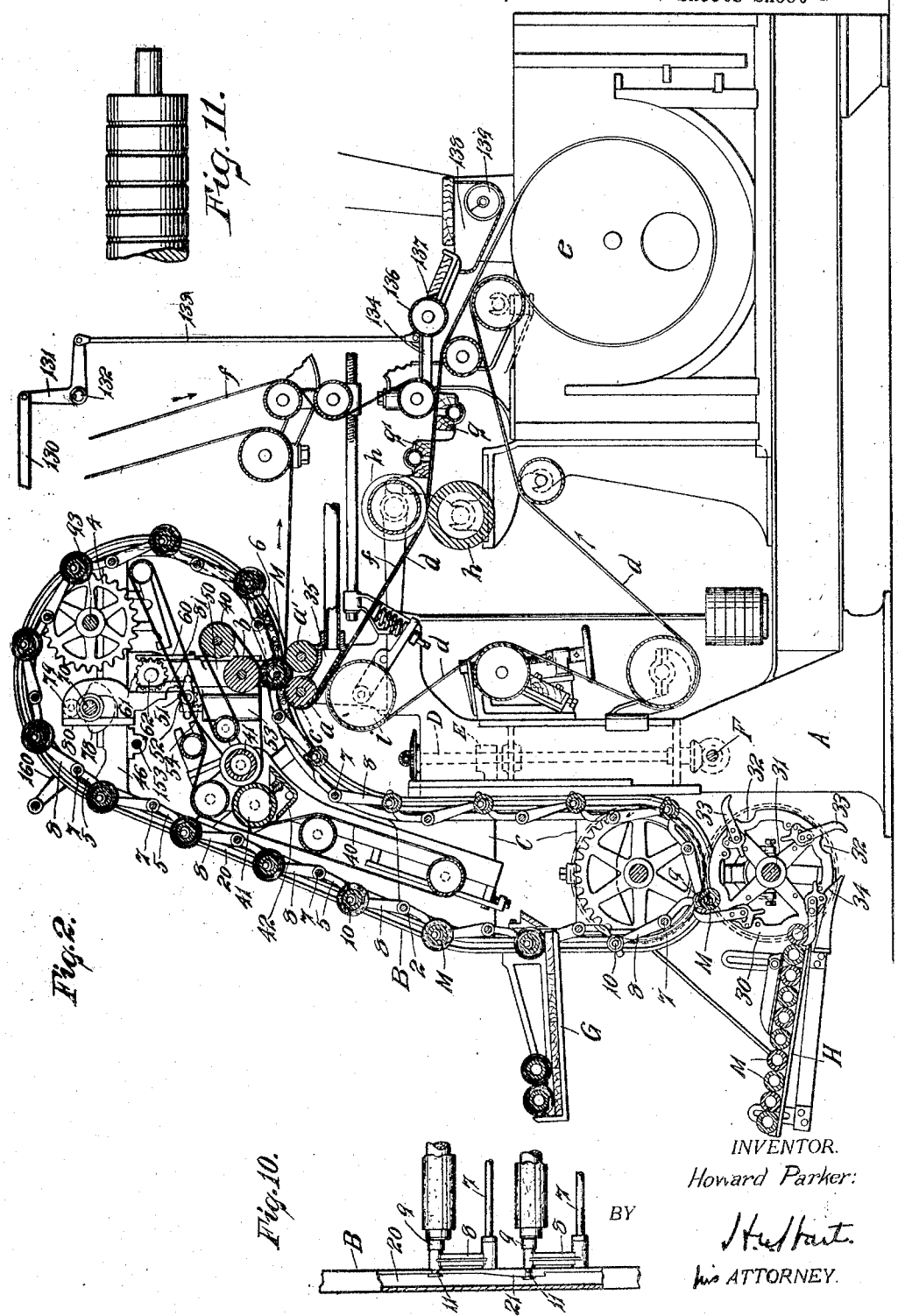

June 10, 1924.
H. PARKER
1,497,344
MACHINE FOR MANUFACTURING TUBES AND OTHER HOLLOW BODIES FROM PULP
Filed Dec. 3, 1915    7 Sheets-Sheet 3
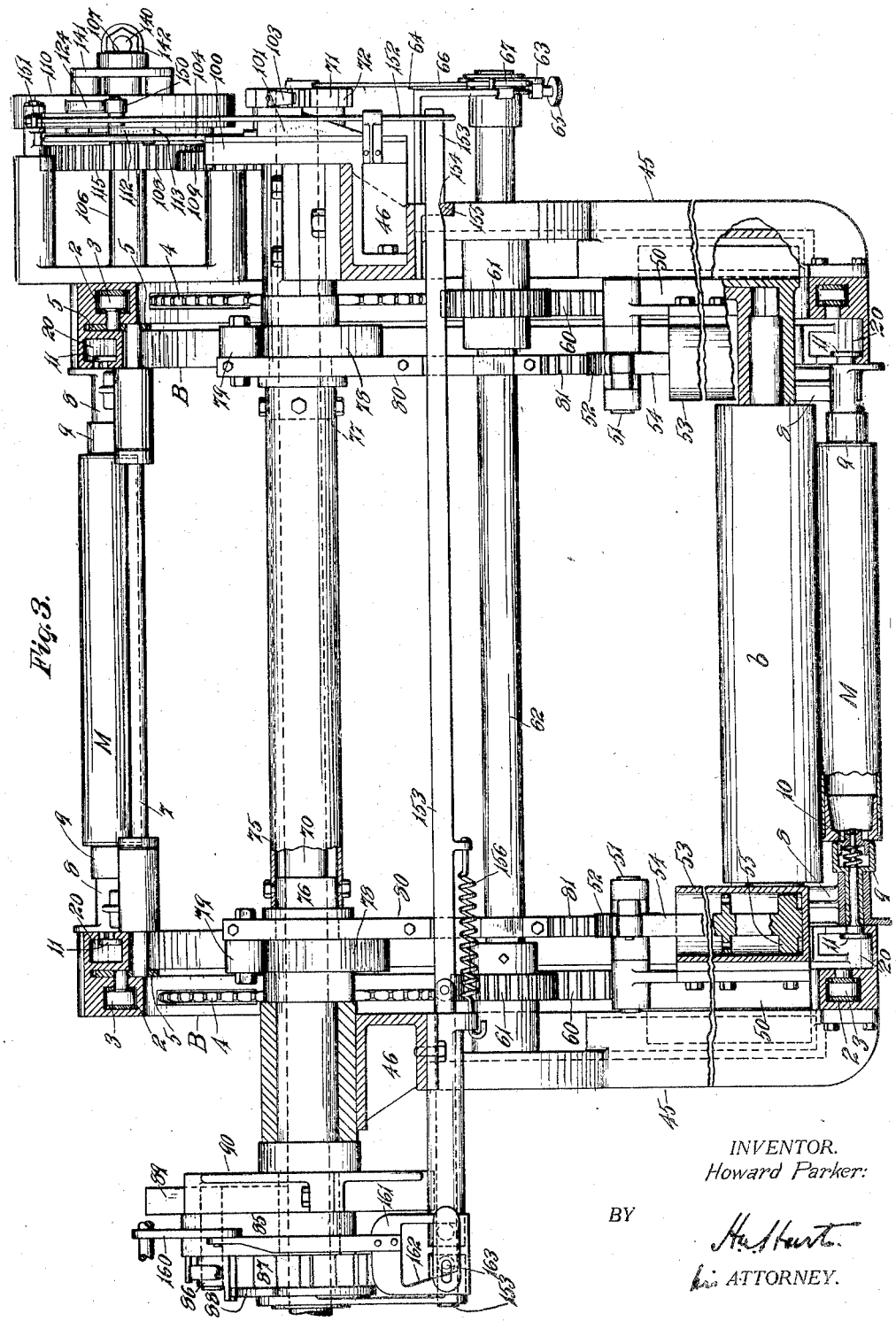
INVENTOR.
Howard Parker:
BY
his ATTORNEY.

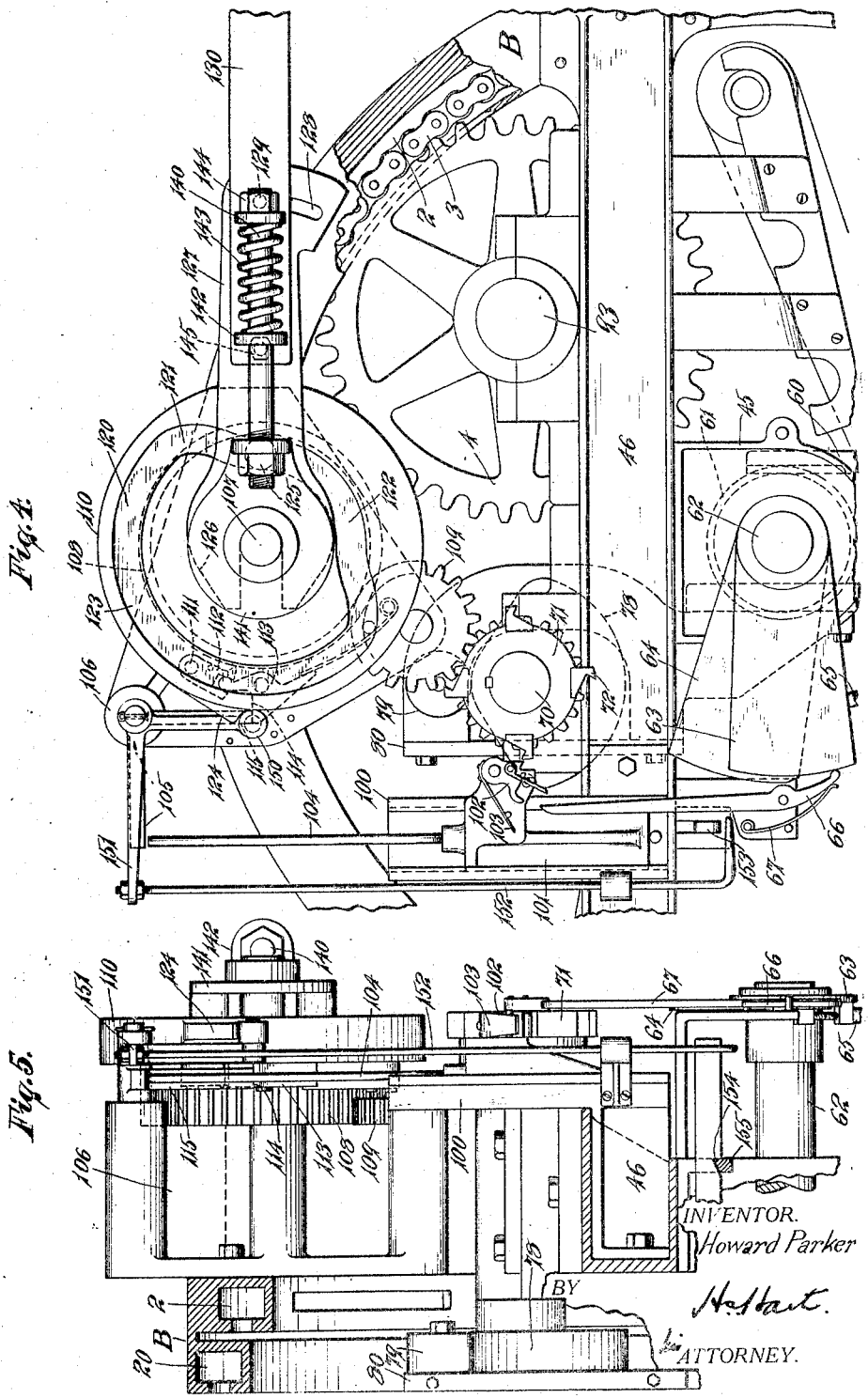

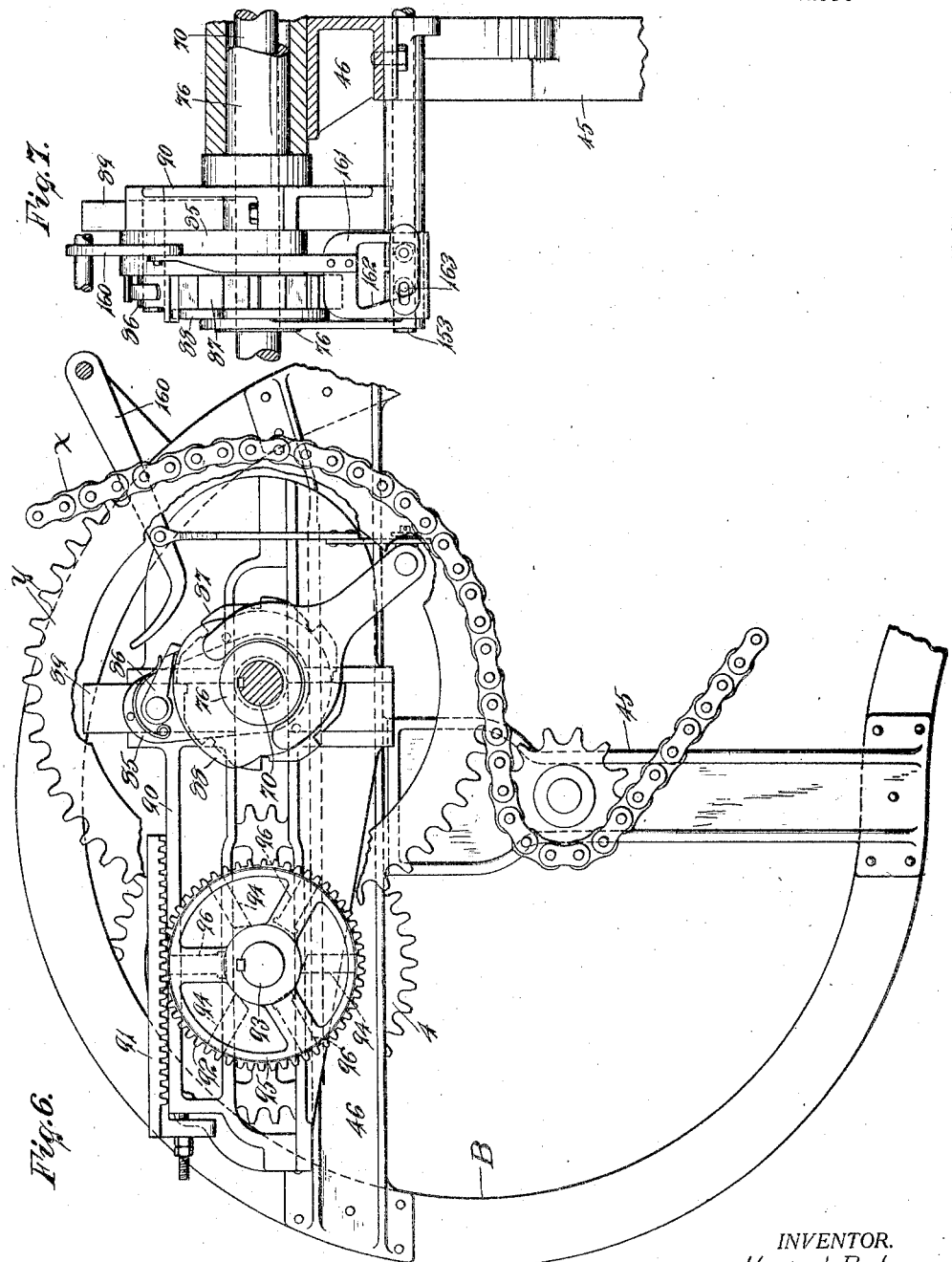

June 10, 1924.  1,497,344
H. PARKER
MACHINE FOR MANUFACTURING TUBES AND OTHER HOLLOW BODIES FROM PULP
Filed Dec. 3, 1915  7 Sheets-Sheet 6
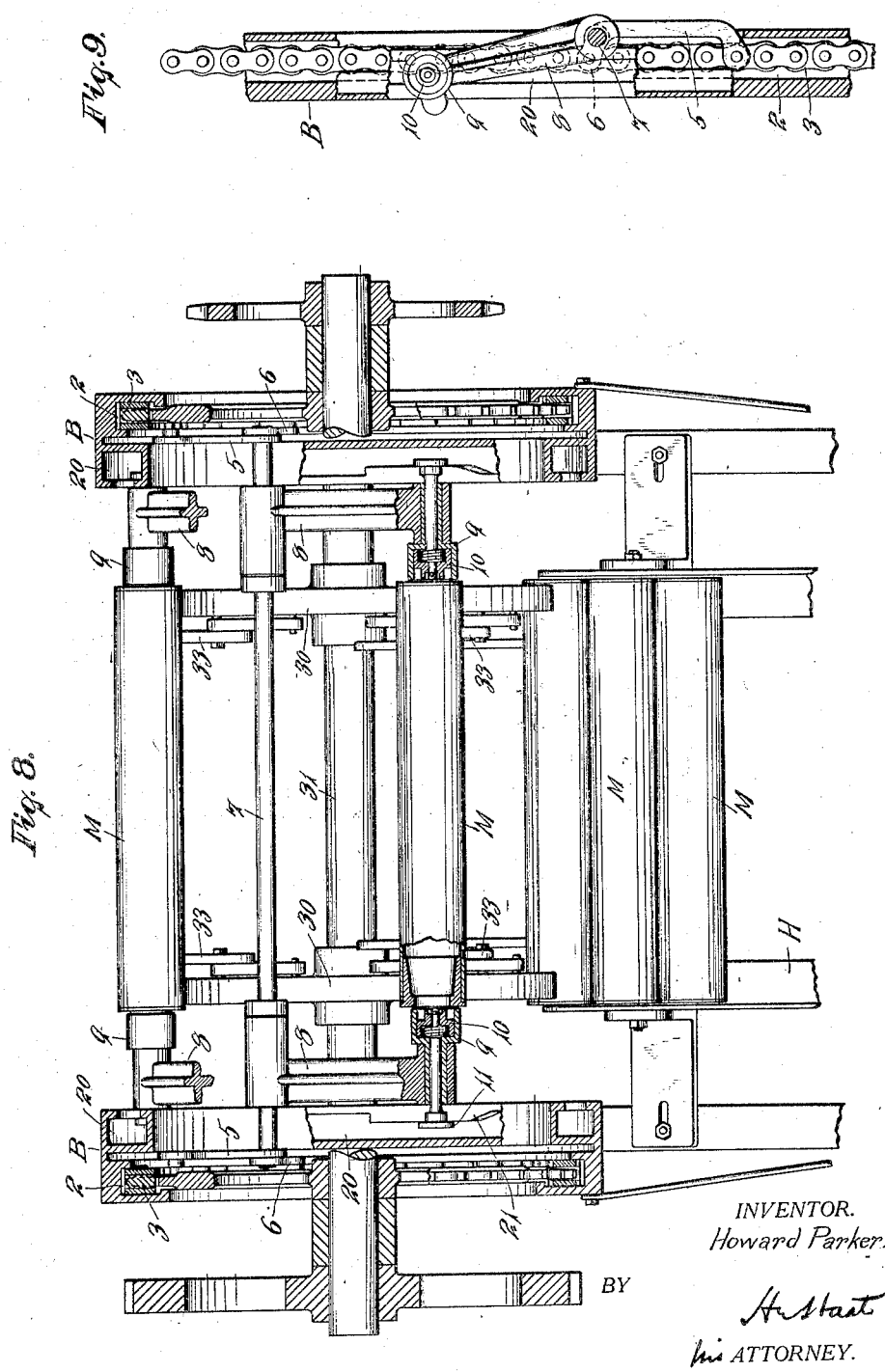
INVENTOR.
Howard Parker:
BY
his ATTORNEY.

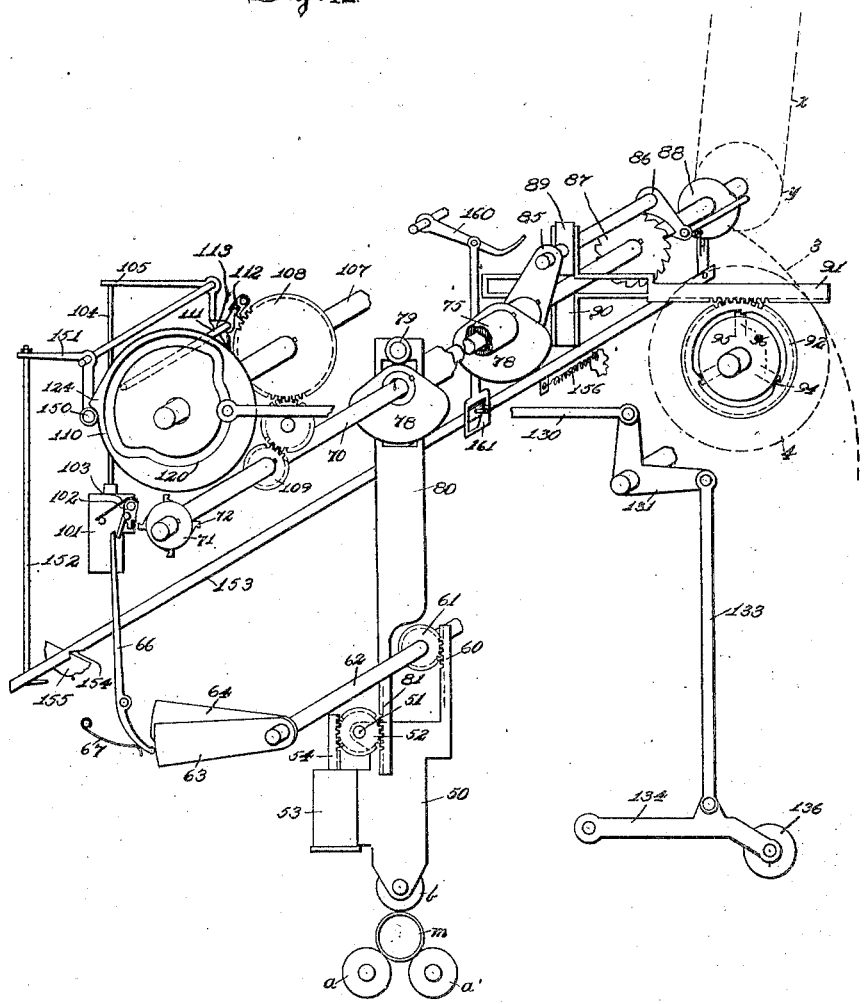

Patented June 10, 1924.

1,497,344

UNITED STATES PATENT OFFICE.

HOWARD PARKER, OF BERLIN, NEW HAMPSHIRE, ASSIGNOR TO BROWN COMPANY, OF PORTLAND, MAINE, A CORPORATION OF MAINE.

MACHINE FOR MANUFACTURING TUBES AND OTHER HOLLOW BODIES FROM PULP.

Application filed December 3, 1915. Serial No. 64,831.

*To all whom it may concern:*

Be it known that I, HOWARD PARKER, a citizen of the United States, and a resident of Berlin, in the county of Coos, State of New Hampshire, have invented certain new and useful Improvements in a Machine for Manufacturing Tubes and Other Hollow Bodies from Pulp.

This invention relates to improvements in machines of the character described. The various features of construction present in this machine will be described with reference to their use in the particular machine now selected for the purpose of illustration, which is a machine for making tubes or pipes by winding a web of pulp onto a mandrel. I here desire it to be clearly understood that the inventions are susceptible of other embodiments and adapted to the manufacture of other articles than tubes or pipes, and that the terms used are merely terms of description and not in any sense terms of limitation. It will be obvious that many features of construction are susceptible of modification to suit different requirements without departing from the spirit of the invention.

The object of this invention has been to produce a machine which is completely automatic in its operation; a machine in which the articles may be completely formed automatically; a machine of maximum efficiency and capacity. The drawings represent the embodiment of the machine chosen for illustration in the following views:

In the drawings—

Fig. 1 is a side view of the machine, showing the driven end.

Fig. 2 is a sectional view of the complete machine looking towards the driving end.

Fig. 3 is a front view of the upper portion of the machine above the base rolls, partly in section on substantially line 3—3 of Fig. 1.

Fig. 4 is a side view of the upper part of the driven end of the machine, on a large scale.

Fig. 5 is a front view thereof.

Fig. 6 is a side view of the upper part of the driving end of the machine on a large scale.

Fig. 7 is a front view thereof.

Fig. 8 is a transverse sectional view on the line 8—8 of Fig. 1, looking in the direction of the arrow.

Fig. 9 is a detail view of one of the end members B, partly in section.

Fig. 10 is a fragmentary view, partly in section, showing the cam for withdrawing the chucks to release the mandrels.

Fig. 11 is a detail view of the part of the base roll A.

Fig. 12 is a view diagrammatically showing the general arrangement and mode of operation of various mechanisms of the machine.

The base of this machine consists of pedestals A, A, rigidly united together and firmly secured on a proper foundation.

The main frame consists of a pair of end members B, B, rigidly united to maintain them in fixed relation with one another, and mounted on a carriage C which slides on the pedestals, being adjustable by means of threaded bars D mounted in the pedestals and running through nuts E connected with the carriage, provision being made for operating the bars simultaneously as by a cross shaft F geared at its ends to the bars.

A base roll or rolls, $a$, $a'$, are mounted in suitable bearings at the top of the pedestals. The cooperating press roll $b$ (or rolls) is carried by the main frame, and it is between these two rolls or sets of rolls that the formative operations of the machine occur. I have referred to it as the manipulating point of the machine. It is in order that the machine may be accommodated to a wide range of work, or adapted to the production of a variety of sizes that the main frame with all of the mechanism, including press rolls, is made adjustable on the pedestal relative to the base rolls mounted thereon.

Preferably, and in order to accommodate parts of the machine mounted thereon, the end members B, B, are skeleton, consisting of similar loop-shaped tracks in the inner faces of which there are double endless grooves or channels 2, 20. In one of these channels, as 2, in each track is an endless chain conveyor 3, driven by a sprocket 4.

Attached to the chains at even intervals are straps 5, at one end directly, and at the other end through a link 6. Bars 7 extending across the machine connect the link ends of corresponding straps, and on these bars, just inside the tracks, are pivoted arms 8, which at their ends support alined chuck housings 9 equipped with inwardly spring-pressed chucks 10, the stems of which are headed as at 11 and travel in the other groove or channel 20 in the tracks.

At the discharge point of the machine the chuck grooves 20 are cammed as indicated at 21, to retract the chucks into their housings and so release a mandrel M, with the ends of which they had been engaged. At the supply point of the machine the cams are shaped to release the chucks just as an empty mandrel is brought into place in order that they may be projected by the springs to engage the mandrel. By preference the chucks do not fit closely in the apertures in the ends of the mandrels, but sufficient clearance is left to permit the mandrels to move without occasioning the movement of the chucks or the arms by which they are supported. The chuck housings, on the other hand, are larger than the apertures in the ends of the mandrels in order to prevent endwise movement of the mandrels. At the discharge point of the machine, a suitable tray or table G is provided upon which the mandrels may drop, to be later removed by the machine attendant.

At the supply point of the machine, mechanism is provided as follows:

The empty mandrels are stacked on an inclined rack H down which they roll against the face of the feeder wheels 30. There is a feeder wheel at each end of a shaft 31, having peripheral notches 32 in alinement, and of a size to receive a mandrel. The wheels have an intermittent motion timed with the feeding mechanism of the conveyor chains, and carry an empty mandrel up into position between a pair of alined chucks while the chucks are retracted. In the machine here illustrated both the conveyor chains with the chucks, and the feeder wheels with the empty mandrels, are moving, and just as their paths of travel coincide, the cams in the chuck grooves release the chucks so that they may be projected into engagement with the mandrel. In other words, both parts are moving when the chucks engage the mandrel. In order to insure that the mandrel shall be properly retained in the notches in the feeder wheels, and so properly positioned with respect to the chucks at the time of engagement, I provide pivoted and overbalanced arms 33 which are cammed down out of the way by the inclined surfaces 34 as the notches come into register with the inclined tracks, and are then immediately released so that the overbalancing weight will throw the arms up against the mandrels, holding them in the notches. The conveyor chains carry the mandrels up to the manipulating point of the machine and are stopped while the manipulation takes place. When the winding of the pulp onto the mandrel is completed, and the upper press roll is raised, the conveyor chains take out the finished mandrel and bring in an empty one. In the machine shown there is one mandrel at the manipulating point, ten full mandrels with tubes wound thereon ahead of it, one full mandrel being discharged, one set of empty mandrel-chucks, one set of chucks just receiving a mandrel, and five empty mandrels being moved towards the manipulating point.

The manipulating point.

The upper and lower press rolls or sets of rolls have been hereinbefore referred to, and description of this portion of the machine will now be taken up, without at this point considering the mechanism for raising the upper press roll to permit of taking out the full mandrel and bringing in an empty one.

As shown, there are two base rolls $a$, $a'$, and a single upper press roll $b$. The two base rolls may well be solid, but one of them, $a$, and which I term the lead roll for the reason that it is about this roll that the web-carrying felt is wrapped, is preferably provided with a series of shallow circumferential grooves $c$. An endless wire apron $d$ runs over suitable guide and tensioning rolls and around the cylinder mold $e$, and it is on this apron that the pulp is formed into a sheet or web and carried off from the mold, the pulp being on the upper side of the wire apron. An endless felt $f$, suitably guided, is laid on top of the web of pulp, so that the pulp web or sheet is between the wire apron and the endless felt. Thus positioned, the web passes over a suction box $g$ for the extraction of moisture; then under a second suction box $g'$ which extracts additional moisture and also draws the pulp web onto the felt. Then, between press rolls $h$, $h$, which extract more moisture, and also insure that the pulp will stick to the felt; thence, up to a point underneath the base rolls where the wire apron leaves the felt with the sheet of pulp held on its underside, and passes around a roll $i$ and thence back around the cylinder mold. A suction box 35 has its end fitted against the lead roll $a$, and its bottom against the felt $f$, and the suction acts through these two sides of the box, with the result that further moisture is withdrawn from the web, and its continued travel with the felt instead of with the wire apron is assured. The felt wraps around the lead roll and over the other base roll. The mandrel fits down between these two rolls, having a bearing point on each, and as the web reaches the mandrel it proceeds to wind up on it, parting with the felt whose direction of travel is deflected away from the manipulating point.

Supported, guided, and driven by rolls mounted on the main frame is an endless absorbent felt 40 which passes between the upper press roll $b$ and the mandrel, and thence through squeeze rolls 41, 41, by which the water absorbed by the belt is extracted and carried away in a trough 42 provided for the purpose. As the web winds up on the mandrel under the pressure which is provided to cause the fibres of one layer to be pressed into and united with the fibres of the adjacent layers, considerable water is pressed out of the pulp. Some of this water collects at the point where the lead roll and the mandrel contact, and would tend to soften the pulp and break the web were it not for the fact that the suction box 35 draws it away through the grooves $c$ in the lead roll. More moisture is extracted between the upper press roll and the mandrel, and would have a tendency to soften the pulp winding onto the mandrel so as to distort it and produce a seamed and wrinkled wall, were it not that this moisture is taken up by the absorbent felt 40 and carried away, and later extracted from the felt. The best tube wall is produced by winding the pulp when it carries a maximum amount of water, since this facilitates the felting of the fibres in adjacent convolutions, giving to the wall a dense homogeneous character, free from liability to split or show laminations. The provision of these or equivalent means for taking away surplus water at the winding point has these advantages: The web as presently used can be pressed harder and more water extracted; or webs carrying a greater percentage of water than is now practicable can be wound and pressed as hard as, or harder than at present without danger of the surplus water running back onto the web to soften it so that it will crush; the resulting product is of a very uniform character with a perfect outer wall, and best adapted for the further treatment to which it is subjected.

The upper portion of each track member is of parti-circular form, and each is provided with a T-shaped end frame. The base of the stem 45 of this frame is secured to the lower run of the track, and the ends of the lateral members 46 to the side runs of the track, these members acting both as stiffening devices for the track and also as a support for the moving parts of some of the mechanism of the machine.

Supported in bearings on the transverse parts 46 of this sub-frame is a shaft 70 which extends entirely across the machine. This is the main shaft of the machine, to one end of which the power is applied as by the chain $x$ and the sprocket $y$, and from which power is transmitted to the other moving parts of the machine. In order to distinguish one side of the machine from the other, the left-hand side, at which power is applied to the main drive shaft, will be called the driving end, and the opposite side will be called the driven end.

The stems 45 form ways upon which carriages 50 may slide up and down. These carriages carry stub shafts 51, on which are mounted pinions 52, and cylinders 53 whose plunger rods 54 are in the form of racks meshing with the pinions. The cylinders are filled with a liquid, such as oil, which is free to flow from one side of the plungers 55 to the other. Racks 60 at the opposite side of the carriages mesh with pinions 61 on a shaft 62 which extends between and is mounted in the stems 45 of the sub-frame members. This shaft projects from the driven end of the machine, and has mounted on it, side by side, a pair of plates 63, 64, one of which, 63, is fast on the shaft 62, and to which the other, 64, is connected by adjusting devices 65 in order that the angular relation of these two plates with respect to one another may be varied. The plate 63, which will be termed the thickness adjuster, is shorter than the other plate 64, which will be called the tripping plate; the function of the thickness adjuster is to support the end of the lever 66 against the action of a spring 67 while the wall of the tube is being built up to proper thickness; and the function of the tripping plate is to engage this end of the lever when the wall of the tube has reached the proper thickness, in order to actuate other mechanism of the machine.

*Web breaking.*

In order that each tube may be completely wound and finished in this machine without requiring additional work or any finishing touches, the web is broken periodically by dropping a roll 136 onto the wire apron soon after it leaves the cylinder mold and while the web is yet in a soft condition, so that the tail end of the web may be wound onto the mandrel and finished off. The roll is dropped by automatically-actuated mechanism which will be later described, and is allowed to remain for a short time in its low position so that immediately after the web is broken that part which is coming from the cylinder mold winds up on the breaking roll and is scraped off by the doctor 137 into a tank or trough 138, from which it is conveyed in some satisfactory manner, as by the screw conveyor 139 shown, to a tank from which it may be pumped back into the stuff chest. As soon as the breaking roll is raised, the web travels along on the wire apron, and before the new end of the web reaches the manipulating point the press roll is raised, the full mandrel has been removed from the manipulating point, an empty mandrel brought into position, and the press roll dropped. The precise timing of the machine in the particulars just mentioned may be adapted to suit the requirements of any particular case.

For actuating this mechanism the following instrumentalities are provided:

Secured to the end of the main shaft at the driven end of the machine is a ratchet 71 having as shown four teeth 72, though the number is not material.

At the driven end of the machine and upstanding from the transverse member 46 of the sub-frame are ways 100 upon which moves a slide 101 on which is mounted a dog 102 to be swung into the path of movement of the ratchet 71 on the main drive shaft 70. A spring 103 normally holds this dog out of the path of the ratchet. The lever 66 pivoted on the sub-frame has its upper end in position to engage the dog to move it into the path of movement of the ratchet, the lever being moved through the agency of the tripping plate 64 which acts upon its lower end. The slide carries an upstanding arm 104 which operates, when the slide is moved upwardly through the engagement of the ratchet 71 on the main drive shaft with the dog 102 on the slide, to engage one end 105 of a bell crank lever pivoted on a support 106 which is attached to the upper part of the track. (When the ratchet on the main shaft disengages from the dog on the slide, the slide drops back into its low position.) In this support 106 there is mounted a shaft 107 carrying a gear 108 driven from the main shaft through the pinion 109, and beside the gear is a cam 110 loose on the shaft. On the back of this cam is a stud 111 supporting a dog 112 engaged by a pivoted rocker 113 which is spring-pressed to throw the dog into engagement with the teeth of the gear, and this rocker has a shoulder 114 which is engaged by the depending end 115 of the bell crank lever, whose other end 105 is actuated by the upward movement of the slide 101 and the arm 104 just above referred to. It will thus be seen that the upward movement of the slide 101 causes the arm 104 to engage with the end 105 of the bell crank lever, rocking the lever to disengage its depending end 115 from the shoulder 114 of the rocker 113, permitting the spring to move the rocker to throw the dog 112 carried by the cam 110 into engagement with the teeth of the gear 108, and so rotate the cam. In the face of this cam is a cam groove 120 having an abrupt rise 121 from a low neutral or inactive portion 122 of rather small extent to a high inactive or neutral portion 123, which extends for about half the circumference of the cam, then gradually dropping into the low neutral portion 122. The low point of the cam at the bottom of the abrupt rise is about diametrically opposite the point of engagement of the depending end 115 of the bell crank lever with the shoulder 114 of the rocker 113, so that at the time the low point of the cam comes to the position shown in Fig. 4, the rocker disengages the dog from the gear and stops the further rotation of the cam. On the periphery of the cam just in advance of the shoulder of the rocker is a projection 124 which acts on the end of a bell crank tripping lever as will be later described. In the cam groove there is a roller 125 mounted in the neck of a fork 126 which slides across the shaft, the fork having a rear extension 127 in the end of which there is a curved slot 128 to take a pin 129 secured near the end of a rearwardly extending connecting rod 130, the other end of which is fastened to a lever 131 fast on the shaft 132 running across the machine and from which through depending links 133 is supported a carriage 134 pivoted at one end as at 135 and supporting in suitable bearings the breaker roll 136, with which is associated the doctor 137, trough 138, and conveyor 139. A bolt 140, secured at one end to a support 141 mounted on the shaft 107, extends rearwardly alongside of the connecting rod 130 and through a hole in the lug 142 fast thereon. Beyond this lug there is a spring 143 encircling the bolt, with a nut 144 at the end of the bolt to vary the initial compression of the spring. The rotation of the cam, caused by the engagement of the dog with the gear causes the roller in the cam groove to travel up the abrupt rise 121 onto the high point 123 of the cam. This shifts the fork longitudinally, and through the pin in the slot moves the connecting rod to the rear, at the same time compressing the spring. The rearward movement of the connecting rod through the lever 131 rocks the shaft 132 which lowers the carriage and drops the breaker roll onto the web of pulp on the wire apron, breaking the web. The curved slot 128 permits the connecting rod to rock downwardly, its forward end being connected with the rear extension of the fork as at 145 to provide a point about which it can turn. The spring being compressed, assists in supporting the breaker roll, relieving the pin and the curved slot from a considerable part of the load. The breaker roll remains down while the high neutral portion of the cam groove passes the roller which is for about half the circumference of the cam. All this time the wire apron is moving, and the pulp is being taken off the apron by the breaker roll and from it doctored off into the trough 138 or other receptacle from which it is conveyed away.

The gradual drop of the cam groove now draws the fork forward, and with it the rearwardly extending bar, raising the roll up off the apron. The new end of the web now proceeds to follow the apron up towards the manipulating point, being in the meantime overlaid by the endless felt $f$ and subjected to the action of the suction boxes.

*Press roll lifting—conveyor driving.*

On the main shaft 70 is a sleeve 75 with its ends secured to quills 76, 77, on which are mounted lifting cams 78, 78, which are of sector shape and act upon rollers 79 carried by the cam lifters 80 from which depend racks 81, which mesh with the pinions 52 on the carriages 50 opposite to the meshing points of the plunger rods 54.

The quill 76 extends through to the driving end of the machine and has attached to it a crank 85 upon which is mounted a dog 86 adapted to engage with a ratchet 87 fast on the driving shaft 70 but controlled in its engagement with and disengagement from said ratchet by a guard 88 movable longitudinally of the driving shaft. The crank 85 is connected through a sliding block 89 with a cross head 90 which reciprocates from front to rear of the machine, sliding on the transverse member 46 of the sub-frame; the cross head carries a rack 91 which meshes with a gear 92 loose on a shaft 93 supported in bearings on the transverse members 46 of the sub-frame and extending across the machine, to which shaft at each side of the machine the sprockets 4, 4, are secured, meshing with the conveyor chains 3. The gear is loose on this shaft and has notches 94. Located beside this gear and keyed to the shaft is a chuck 95 having dogs 96 adapted to engage with the notches in the gear in one direction of rotation of the gear.

Just before the shoulder 114 of the rocker 113 comes into engagement with the depending end 115 of the bell crank lever, the projection 124 strikes the end 150 of the tripping lever (see Fig. 4), the lateral arm 151 of which is connected with a depending trip 152. The lifting of this trip raises the end of a bar 153 extending across the machine from the driven to the driving end to disengage a notch 154 therein from a catch 155 on the frame.

The bar 153 when released is moved endwise towards the driving end of the machine by a spring 156 and is connected with the guard 88 which controls the engagement and disengagement of the ratchet dog 86 on the crank 85 with the ratchet 87 on the main driving shaft. The movement of the bar to the left takes the guard out from under the ratchet dog, allowing the latter to drop into engagement with the ratchet 87 on the main shaft 70, with the result that the crank is rotated, and with it the quills 76, 77, on which the lifting cams 78, 78, are mounted. The lifting cams acting on the lifters 80, 80, and through the depending racks 81, pinions 52, and the plunger rod racks 54, whose plungers are in the oil-filled cylinders 53, raise the carriages 50, 50, in which the upper press roll $b$ is mounted. These lifters act so quickly that the fluid has not time to escape by the pistons.

The crank has meanwhile moved the cross head to the rear, the rack rotating the gear but without engaging the dogs of the chuck with the notches in the gear. Continued rotation of the crank, moving the cross head in the opposite direction, reverses the rotation of the gear 92, and causes the notches in the gear to engage with the dogs of the chuck, rotating the shaft 93, and thus the sprockets 4, 4, and so moving the conveyor chains 3, carrying the mandrels M ahead, taking a full mandrel from the manipulating point and bringing in an empty mandrel, as has been heretofore described.

After an empty mandrel has been brought to the manipulating point, the cams 78, 78, drop the press roll $b$ onto the mandrel.

As the crank completes its rotation, it engages a stopping lever 160, which normally stands in the path of the crank, and raises it. Depending from this stopping lever is a stirrup 161 having an inclined wall 162 which engages a pin 163 on the bar 153, and shifts the bar longitudinally toward the driven end of the machine, engaging the notch 154 with the stop 155 on the frame. This longitudinal movement of the bar carries the guard 88 under the dog 86, disengaging it from the ratchet 87, thus disconnecting the crank from the main shaft 70 and bringing to rest all the mechanism having to do with the mandrel-conveying devices. As the crank passes by the stopping lever, the latter drops by gravity to its normal position.

The new end of the web of pulp commences to wind up on the empty mandrel which has been brought to the manipulating point, and continues until the proper thickness of the tube wall is reached, when the various mechanisms are tripped and set in motion in proper order.

An important feature of the machine, to which it is desired to call attention, is the provision which has been made to permit the carriages 50, 50, and the press roll $b$ to rise during the winding of the web on the mandrel and before the quills are released, to cause the cams to raise the cam lifters 80, 80. This is made possible by the compensating mechanism, which includes the cylinders 53 with their plungers 55, plunger rod racks 54 meshing with the pinions 52 mounted on the carriages, and with which the rack 81 on the cam lifter 80 meshes.

It will be seen that as the press roll and carriages move up during the winding of the tube, the pinion 52 will roll up the rack 81, thus drawing the plunger up in the cylinder and allowing the liquid to pass down underneath it. The action of the cams 78 on the cam lifters 80 is so quick that more liquid cannot run down underneath the plungers in the cylinders, with the result that the carriages 50 are raised bodily with the cam lifters. It is preferable to have the amount of this raising motion of the carriages always uniform, and in the machine shown the amount that the carriages, and consequently the upper press roll, are lifted, is two inches. If the thickness of the wall of the finished tube is a quarter of an inch, the press roll is moved up one half inch before the cam lifter moves, so that when the carriages have been raised by the cam lifters, the bottom of the press roll is two and one half inches above the top of an empty mandrel.

While the carriages and press roll are held up by the cams, the weight of the carriages and roll tends to cause them to drop relative to the cam lifters, which means that the pinions 52 must roll down the cam lifter racks 81, with the result that the plunger racks and plungers are forced down into the cylinders, causing the liquid to flow up above the plungers.

The cams 78 release the cam lifters 80, lowering the carriages 50, 50, and the press roll b, so that the latter rests on the empty mandrel just before the plungers 55 bottom in the cylinders 53, thus insuring pressure on the mandrel from the commencement of the winding operation.

Operation.

The complete chain of operations will now be described as nearly as possible in the order in which they occur.

It is to be remembered that the driving shaft 70 and all parts directly connected with or driven from it, are continuously rotating. All other parts of the machine have periodic or intermittent motion.

Starting with the assumption that a tube is just completed at the manipulating point, so that the tripping plate 64 is just engaging the lower end of the lever 66: The tripping plate 64 rocks the lever 66, throwing the dog 102 on the slide 101 into engagement with the ratchet 71 at the driven end of the main shaft. This raises the slide and its upstanding arm 104, releasing the rocker 113, which throws the dog 112 carried by the cam 110 into engagement with the adjacent gear 108 loose on the shaft 107. The rotation of the cam immediately drops the breaker roll 136 and severs the sheet, and the balance of the mechanism of the machine continues to operate to finish winding up the tail end of the web so as to complete the tube. The continued rotation of the cam now raises the breaker roll, and just before it comes to a stop by reason of the engagement of the shoulder 114 on the rocker with the depending arm 115 of the bell crank lever, the projection 124 on the periphery of the cam engages the depending arm 150 of the tripping lever. The tripping lever, actuated by the projection 124, releases the cross bar 153 which is shifted by the spring 156 towards the driving end of the machine, withdrawing the guard 88 from under the ratchet dog 86.

The ratchet 87 on the main shaft at the driving end of the machine now engages the dog 86, rotates the crank 85, the quill 76, sleeve 75, and quill 77 connected therewith, and the lifting cams 78, 78, secured to the quills 76, 77. The lifting cams acting on the rolls 79 on the cam lifters 80 raise the cam lifters and the carriages 50 in which the upper press roll is mounted, and during this time the cross head is moved to the rear. As the crank starts its upward travel toward its normal position of rest, and while the upper press roll is held up by the lifting cams, the cross head 90 moves forward, the gear 92 engaging with the chuck 95 on the shaft 93, rotating that shaft and the sprocket wheels 4, 4, which mesh with the conveyor chains 3, 3, moving the conveyor chains ahead to take out from the manipulating point the full mandrel and carry in to the manipulating point an empty mandrel. The lifting cams lower the carriages and drop the press roll onto the empty mandrel. The crank 85 then engages and raises the stopping lever 160, which, through the stirrup 161, shifts the cross bar 153 laterally toward the driven end of the machine, engaging its notch 154 with the catch 155 on the frame and drawing the guard 88 under the ratchet dog 86 of the crank 85, disengaging the dog from the ratchet 87 and stopping the machine. The new end of the pulp web is just coming up to the manipulating point, and starts to wind up on the mandrel, and continues to wind until the wall of the pipe has reached a proper thickness, when the automatic operations just described are repeated.

In addition to the main drive shaft which is continuously rotating, the wire apron, the endless felt, the base rolls and the absorbent felt are continuously moving. When the stopping of the machine is mentioned, the stopping of the intermittently-moving parts is referred to.

In order to simplify the description of the machine, its design and equipment for the manufacture of pipes or tubes by winding the web of pulp onto a mandrel have been described in more or less specific terms. I now desire it to be clearly understood that these terms which have been used are merely descriptive, and in no sense are they to be considered as having a limiting effect. It will be readily apparent that the features of invention present in this machine are adapted for the production of a large variety of shapes or forms, and that many of the features of construction described are susceptible of alteration and modification in various particulars without departing from the spirit of the invention.

I claim as my invention:

1. In a machine of the character described, a supply point for empty mandrels, a manipulating point, and a discharge point, and a mandrel conveyor provided with automatically actuated mandrel-engaging means traversing said points.

2. In a machine of the character described, a supply point, a manipulating point, and a discharge point, a conveyor traversing said points, mandrel-holding means carried by said conveyor, mandrels rotatably mounted thereon, means at the supply point for automatically actuating said holding means to engage them with the mandrels, and means at the discharge point for automatically actuating said holding means to disengage them from the mandrels.

3. In a machine of the character described, a flexible conveyor member at each end of the machine, means for causing said members to move together, alined mandrel holders carried by said conveying members, and mandrels positioned between said conveyor members and supported at their ends by said holders.

4. In a machine of the character described, a conveyor member at each end of the machine, means for causing said members to move together, pairs of cooperating alined mandrel holders carried by said members, and automatically operated means actuating said holders to engage them with and disengage them from the mandrels.

5. In a machine of the character described, a base roll, press roll, lifting mechanism for said press roll, a conveyor, means for driving it, mandrels supported and carried by said conveyor, a rotatable member, means for stopping and starting it periodically, connections between said member and said lifting mechanism to raise said press roll and hold it in raised position, connections between said member and the driving means for the conveyor to move said conveyor while said press roll is raised, and means actuated by said rotatable member to stop its rotation.

6. In a machine of the character described, an endless conveyor, supply, manipulating and discharge points at spaced positions in the path of travel of said conveyor, rotatably mounted mandrels carried by the conveyor to said points, means at the manipulating point for rotating said mandrels and means for stopping said conveyor with a mandrel at the manipulating point.

7. In a machine of the character described, an endless conveyor member at each end of the machine, mandrels supported at one end by one member, and at the opposite end by the other member, connections between said members, and means for driving them together.

8. In a machine of the character described, mandrels, mandrel holding means, a conveyor for said holding means, and means for automatically operating said holding means for engaging them with and disengaging them from said mandrels.

9. In a machine of the character described, a track member at each end, an endless groove in each track, a conveyor member in each groove, mandrel-holding means carried by the conveyors, and mandrels positioned between and engaged at their ends by said holding means.

10. In a machine of the character described, a track member at each end of the machine, an endless groove in each track, endless conveyor members in said grooves, mandrel-holding means carried thereby, a second endless groove in each track, said mandrel-holding devices projecting into and riding in the last mentioned grooves.

11. In a machine of the character described, a track member at each end of the machine, an endless groove in each track, endless conveyor members in said grooves, mandrel-holding means carried thereby, a second endless groove in each track, said mandrel-holding devices projecting into and riding in the last mentioned grooves, and cams in said grooves to retract said mandrel-holding means and disengage the mandrels therefrom.

12. In a machine of the character described, a track member at each end of the machine, an endless groove in each track, endless conveyor members in said grooves, mandrel-holding means carried thereby, a second endless groove in each track, said mandrel-holding devices projecting into and riding in the last mentioned grooves, and cams in said grooves to release said holding means to engage them with mandrels.

13. In a machine of the character described, a track member at each end of the machine, an endless groove in each track, endless conveyor members in said grooves, mandrel-holding means carried thereby, a second endless groove in each track, said mandrel-holding devices projecting into and riding in the last mentioned grooves, means in said grooves for retracting said mandrel-engaging means, means in said grooves for subsequently releasing said mandrel-engaging means, and means for delivering an empty mandrel in position to be engaged by said holding means when they are released.

14. In a machine of the character described, a track at each end of the machine, double grooves in each track, a conveyor member in one groove of each track, alined mandrel holding means carried by said conveyor members, said mandrel-holding means comprising a chuck housing, and a chuck having a headed stem riding in the other groove of each track member.

15. In a machine of the character described, a track at each end of the machine, double grooves in each track, a conveyor member in one groove of each track, alined mandrel holding means carried by said conveyor, said mandrel-holding means comprising a chuck housing, and a chuck having a headed stem riding in the other groove in each track member, and mandrels apertured to receive said chucks, said apertures in the mandrels being larger than said chucks.

16. In a machine of the character described, a track at each end of the machine, double grooves in each track, a conveyor member in one groove of each track, alined mandrel-holding means carried by said conveyor members, said mandrel-holding means comprising a chuck housing, and a chuck having a headed stem riding in the other groove of each track member, and mandrels apertured to receive said chucks, the apertures in the mandrels being smaller than the chuck housings and larger than the chucks.

17. In a machine of the character described, conveyor mechanism, mandrel holders carried thereby, automatically operated means to supply empty mandrels to said holders, automatically operated means of actuating said holders to engage them with said mandrels, and automatically operated means actuating said holders to disengage full mandrels therefrom.

18. In a machine of the character described, spaced conveyor members, removable mandrels rotatably supported therebetween, driving means for the conveyor members, and means for intermittently operating said driving means.

19. In a machine of the character described, mandrel-conveying means, driving means therefor, a shaft on which said driving means is mounted, a reciprocating device movable transversely of said shaft, and connections between said shaft and said reciprocating device effective during the movement of the latter in one direction to move said shaft.

20. In a machine of the character described, mandrel-conveying means, driving devices therefor, a shaft upon which said devices are mounted, a continuously rotating driving shaft, a crank, means for periodically connecting said crank for rotation with said driving shaft, and driving connections between said crank and said first mentioned shaft.

21. In a machine of the character described, mandrel-conveying means, driving devices therefor, a shaft upon which said devices are mounted, a continuously rotating main driving shaft, a crank, means for periodically connecting said crank with said main driving shaft for rotation therewith, a reciprocating member operated by said crank, and driving connections between said reciprocating member and said first mentioned shaft.

22. In a machine of the character described, mandrel-conveying means, driving devices therefor and a shaft upon which said devices are mounted, a member fast to said shaft, a driver loose on said shaft adjacent to said member, means operable from said main driving shaft to move said driver rotarily in opposite directions, and driving connections between said member and said driver effective during the movement of said driver in one direction.

23. In a machine of the character described, mandrel-conveying means, driving devices therefor, a shaft on which said driving devices are mounted, a chuck keyed to said shaft, a gear loose on said shaft adjacent to said chuck, driving devices between said chuck and gear effective during the rotation of the latter in one direction, a reciprocating cross-head, a rack carried thereby and meshing with said gear, a main driving shaft, a crank, means for periodically engaging said crank for rotation with said shaft, and operative connections between said crank and said cross-head.

24. In a machine of the character described, mandrel-conveying means, driving devices therefor, and a shaft on which said devices are mounted, a continuously rotating main driving shaft, a member adapted for periodic engagement with said main driving shaft, automatically operated means for engaging said member with said shaft, means actuated by said member for disengaging it from said shaft and operative connections between said members and the driving devices for said mandrel conveying means.

25. In a machine of the character described, a main driving shaft, a member adapted for periodic engagement therewith, automatically operated means for establishing said engagement, lifting cams connected with and operated by said member, mandrel-conveying means, driving devices therefor, a shaft on which said driving devices are mounted, and connections between the last mentioned shaft and said member effective during a portion of the rotation of the latter to cause the movement of said shaft.

26. In a machine of the character described, a continuously rotating driving shaft, a periodically rotating shaft, a member adapted for periodic engagement with said driving shaft to cause its movement therewith, and connections between said member and said periodically rotating shaft to rotate the latter periodically in a direction opposite to the direction of rotation of the driving shaft.

27. In a machine of the character described, a press roll, means for raising said press roll and holding it in a raised position, mandrel-conveying means and driving devices therefor, a driving shaft and a member adapted for periodic engagement therewith, connections between said member and said press roll raising means, and connections between said member and said driving devices.

28. In a machine of the character described, a web-conveyor, a web-breaker and controlling mechanism therefor, and automatic means for periodically actuating said web-breaker; mandrel-conveying means and driving devices therefor, a press roll and means for raising and holding it in raised position, a member connected with said raising means and said driving devices, a driver for said member, and means actuated by said controlling mechanism for periodically connecting said driver with said member.

29. In a machine of the character described, a web-conveyor, a web-breaker and controlling mechanism therefor, and automatic means for periodically actuating said web-breaker, mandrel-conveying means and driving devices therefor, a press roll and means for raising and holding it in raised position, a member connected with said raising means and said driving devices, a driver for said member, means actuated by said controlling mechanism for periodically connecting said driver with said member, and means actuated by said member for disconnecting it from said driver.

30. In a machine of the character described, tracks at opposite ends of the machine, grooves in their opposing faces, a chain conveyor member mounted in each groove, a series of pairs of oppositely arranged and alined mandrel holders carried by said chains, and mandrels each of which is supported at its ends by a pair of said holders.

31. In a machine of the character described, tracks at each end thereof, grooves in opposing faces of said tracks, a chain conveyor member mounted to travel in each groove, mandrels rotatably supported by and between said conveyor members, and means for moving said conveyor members intermittently.

32. In a machine of the character described, oppositely arranged grooved tracks, chain conveyor members mounted in the grooves in said tracks, alined mandrel supporting devices carried by said members, and a mandrel supported by and between a pair of said alined devices.

33. In a machine of the character described, cooperating alined mandrel-engaging chucks, conveyors upon which said chucks are mounted, means for periodically moving said conveyors, and automatically operating means for actuating said chucks to disengage them from mandrels.

34. In a machine of the character described, cooperating alined mandrel-engaging chucks, conveyors upon which said chucks are mounted, means for periodically moving said conveyors, and automatically operating means for actuating said chucks to engage them with mandrels.

35. In a machine of the character described, alined mandrel-engaging chucks, conveyors upon which said chucks are mounted, means for periodically moving said conveyors, automatically operated means for retracting said chucks, and means for projecting said chucks when released.

36. In a machine of the character described, a pair of oppositely arranged track members, each of which is provided with a plurality of grooves or channels, a conveyor member in one channel of each track member, alined mandrel holding devices carried by said conveyor members, flanged members connected with movable parts of said devices and riding in the other channel of each track member, and means in the last mentioned channels engageable with said flanged members to control the movable parts of said devices.

37. In a machine of the character described, mandrels provided with apertured ends, mandrel-conveyor members, alined mandrel-engaging means mounted on said members, and a housing for said engaging means larger than the apertures in the ends of said mandrels.

38. In a machine of the character described, mandrels with apertured ends, mandrel-conveyor members, alined mandrel-engaging means mounted on said members, a housing for said engaging means larger than the apertures in the ends of said mandrels, and said engaging means being smaller than the apertures in the ends of said mandrels.

39. In a machine of the character described, flexible conveyor members spaced apart, alined mandrel engaging devices carried by said conveyor members and comprising housings connected with said conveyor members, chucks longitudinally movable in said housings, springs to normally project said chucks to engage the ends of a mandrel, and automatic means for retracting said chucks to disengage them from a mandrel.

40. In a machine of the character described, spaced mandrel-conveyor members, straps secured at one end directly to said members, links connecting the opposite ends of said straps to said members, rods extending between said members and connected at their ends with the link ends of said straps, arms pivoted on said rods at each end, and mandrel engaging means in the ends of said arms.

41. In a machine of the character described, spaced and similarly-arranged track members, each of which is provided with a plurality of channels or grooves, a conveyor member in one channel of each member, straps secured at one end directly to said members and links connecting their opposite ends to said members, arms pivotally supported at the link ends of said straps, alined mandrel engaging means mounted in the ends of said arms, and flanged members forming a part of said engaging means located and moving in the second channel of each track member.

42. In a machine of the character described, traveling mandrel-conveying means and alined mandrel-engaging devices carried thereby, and mandrel-carrying means whose path of movement is in part coincident with and in the same direction as the path of movement of said mandrel-engaging means.

43. In a machine of the character described, traveling mandrel-conveying means and alined mandrel-engaging devices carried thereby, mandrel-carrying means whose path of movement is in part coincident with and in the same direction as the path of movement of said mandrel-engaging means, and means for driving said carrying means at the same speed of said conveying means.

44. In a machine of the character described, traveling mandrel-conveying means and alined mandrel-engaging devices carried thereby, mandrel-carrying wheels having spaced notches in their peripheries, a downwardly inclind mandrel support terminating at the peripheries of said wheels, means on said wheels adjacent to the notches for transferring a mandrel from said support to said wheels and holding it in the notches, said wheels carrying said mandrel in a path of movement which in part coincides with the path of movement of said mandrel-engaging devices, and controlling means for said mandrel-engaging devices operable at the point where their path of movement coincides with the path of movemest of the mandrel carried by said wheels to engage a mandrel.

45. In a machine of the character described, traveling mandrel-conveying means, mandrel-engaging devices carried thereby, a stationary mandrel support, and means for moving a mandrel from said support to a position between a pair of alined mandrel engaging devices.

46. In a machine of the character described, a press roll, lifting means therefor, and a compensating connection between said roll and lifting means.

47. In a machine of the character described, a press roll, lifting means therefor, and means to permit downward movement of said roll to a limited extent relative to said lifting means after the latter has operated.

48. In a machine of the character described, a base roll, a press roll, a mandrel located therebetween and upon which the winding takes place, means for lifting said press roll to permit the removal of the mandrel after the winding operation is finished, said press roll being movable independently of said lifting means during the winding operation.

49. In a machine of the character described, a base roll and press roll between which winding operations take place, carriages at each end of the machine, bearings for said press roll mounted in said carriages, ways in which said carriages slide, a cylinder carried by each carriage, a fluid in said cylinders, a plunger and plunger rod for each cylinder, said plunger rods being in the form of racks, a pinion mounted on each carriage and meshing with the racks of said plunger rods, lifters having depending racks meshing with said pinions opposite the meshing points with said plunger rod racks, means holding said lifters against movement during the winding operation, and means for raising said lifters, said carriages and said supported press roll being movable relative to said lifters in the high and low position of the latter.

50. In a machine of the character described, web-conveying, web-winding, and web-breaking mechanisms, a press roll forming a part of the winding mechanism, lifters for said press roll, means for periodically operating said lifters, and means actuated by said web-breaking mechanism for releasing said operating means.

51. In a machine of the character described, web-conveying, web-winding and web-breaking mechanisms, a press roll forming a part of the winding mechanism, lifters for said press roll, operating means for said lifters, starting and stopping mechanism for said operating means, controlling devices for said web-breaking mechanism, a crank connected with said operating means, means actuated by the controlling devices for said web-breaking mechanism to release said crank, means for driving the crank when released, and means actuated by said crank to disconnect said driving means.

52. In a machine of the character described, vertically movable carriages, a press roll mounted in suitable bearings therein, a cylinder mounted on each carriage, a stub shaft mounted on each carriage, a pinion on said stub shafts, plungers in said cylinders, fluid in said cylinders adapted to move from one side of said plungers to the other, racks connected with said plungers and meshing with said pinions, lifters provided with racks meshing at the opposite side of said pinions from said plunger racks, and means for moving said lifters.

53. In a machine of the character described, web-manipulating mechanism, web-forming mechanism, a web conveyor, and means located between said manipulating and forming mechanism for periodically breaking said web and removing a portion of it.

54. In a machine of the character described, manipulating mechanism, a web conveyor, a web breaker, and means controlled by the amount of web supplied to said manipulating mechanism for actuating said breaker periodically to move it into contact with said web.

55. In a machine of the character described, a manipulating mechanism, a web conveyor, a pivotally mounted carrier, a breaker supported by said carrier, means for normally holding said breaker out of contact with said web, and means controlled by the amount of web supplied to said manipulating mechanism for periodically moving said breaker into contact with said web.

56. In a machine of the character described, the combination with web-forming and web-conveying mechanism of a web-breaking mechanism, and means for moving said breaking mechanism to operative and inoperative positions and for retaining it at rest in each position.

57. That improvement in the manufacture of tubes, etc., by winding a wet web of pulp on to a mandrel which consists in breaking said web just before the winding is completed and while the web carries more water than it does at the winding point.

58. In a machine of the character described, a web conveyor, a pivotally mounted carrier, a breaker supported by said carrier, means for normally holding said breaker out of contact with said web, and automatically operated means for periodically moving said breaker into contact with the web.

59. In a machine of the character described, a conveyor for an endless web of pulp, means for taking the endless web from the conveyor and manipulating it, a web-breaker arranged adjacent to said conveyor but normally inoperative, controlling mechanism for said breaker, and means actuated by the manipulation of the web for releasing said controlling means to break said web after its manipulation has proceeded.

60. In a machine of the character described, a web conveyor, web manipulating mechanism, a web breaker, a cam to control the movement of said web breaker, adjustable tripping mechanism moved by said manipulating mechanism, a cam stopping device, and means operable by said tripping mechanism for releasing said cam.

61. In a machine of the character described, a web conveyor, web manipulating mechanism, a web breaker, a cam to control the movement of said web breaker, adjustable tripping mechanism moved by said manipulating mechanism, a cam stopping device, means operable by said tripping mechanism for releasing said cam, and means for rotating said cam when released.

62. In a machine of the character described, a base roll, a mandrel, an upper press roll, bearings therefor mounted in suitable supports, a conveyor to carry a web of pulp to the mandrels, and means for breaking said web comprising a breaker normally supported in raised position but adapted to be dropped onto said web to break it transversely, controlling means for said breaker, means for stopping said controlling means, mechanism operable by the vertical movement of said press roll during the winding action to release said controlling means, and means for operating said controlling means when released.

63. In a machine of the character described, means for periodically breaking a web of pulp, and controlling devices for said means comprising a shaft upon which is mounted a continuously rotating member, a cam loose on said shaft adjacent to said rotating member, connections between said cam and breaking means, means on said cam for engaging said rotating member, a stop to disengage said means from said rotating member, and automatically actuated mechanism for periodically releasing said engaging means.

64. In a machine of the character described, the combination with web-conveying, web-manipulating, and web-breaking mechanisms, and a vertically moving press roll, of controlling means for said breaking mechanism comprising a continuously rotating member mounted on a shaft, a cam loosely mounted on said shaft adjacent said rotating member, connections between said cam and breaking mechanism, means on said cam adapted for engagement with said rotating member, a stop for disengaging said means, a trip moved by the vertical movement of the press roll, a slide provided with a dog actuated by said trip, and means engaging said dog when moved by said trip to raise said slide and release said stop.

65. In a machine of the character described, the combination with web-conveying, web-manipulating and web-breaking devices, of a pivotally mounted carriage upon which said breaking device is mounted, links connecting said carriage with a raising and lowering device, a cam connected with said raising and lowering device, a spring forming a portion of said connection, and means for periodically actuating said cam.

66. In a machine of the character described, a main shaft provided with a ratchet, a slide provided with a dog normally held in inoperative position, a lever for moving said dog into the path of said ratchet, an adjustable trip to actuate said lever, a movable press roll actuating said trip, a web conveyor, a web breaker, controlling mechanism therefor, a stop for said controlling mechanism, and operative connections between said stop and said slide.

67. In a machine of the character described, a base roll, a suction device acting against the surface thereof, and channels in the surface of the roll communicating with the suction device.

68. In a machine of the character described, a base roll channeled in its surface, a web-carrying felt wrapped about said roll and partly closing said channels, and a suction device acting in the closed parts of said channels.

69. A base roll provided with a solid surface and circumferential channels formed in said surface.

70. In a machine of the character described, a base roll, the surface of which is circumferentially grooved, a web-carrying felt passing partly around said roll, and a suction device positioned at the lap of the felt onto the roll and acting in the grooves.

71. In a machine of the character described, spaced press rolls, a web-carrying felt passing about the lower, an absorbent felt passing about the upper and a mandrel located between said rolls, and upon which a web of pulp is adapted to be wound.

72. In a machine of the character described, a web-carrying felt, an oppositely arranged absorbent felt spaced therefrom, a mandrel located between said felts, and a press roll acting on said mandrel through said absorbent felt.

73. In a machine for winding a web of pulp onto a mandrel, a base roll, a press roll, a mandrel positioned therebetween, and an absorbent felt between said press roll and said mandrel.

74. That improvement in the formation of bodies by winding a web of pulp on to a mandrel, which consists in exerting pressure on the pulp as it is being wound on to the mandrel through an absorbent material which is relatively drier than the pulp in order that it may carry away excess water pressed from the pulp.

75. That improvement in the formation of bodies by winding a wet web of pulp onto a mandrel which consists in exerting pressure on the pulp at a point beyond that at which the pulp initially contacts with the mandrel through an absorbent material which is relatively drier than the pulp in order that it may carry away excess water pressed from the pulp.

76. In a machine of the character described, a base, a base roll mounted thereon, a frame and a press roll mounted thereon, means for moving said frame vertically relatively to said base, and means for moving said press roll relative to said frame.

77. In a machine of the character described, a base roll, a press roll, a web conveyor, a web breaker, mandrel conveying mechanism and means for driving said conveyor mechanism, of means for periodically operating said web-breaker, means for periodically lifting the press roll after the web is broken, means for periodically moving the mandrel conveying mechanism while the press roll is raised, and means for restoring the parts to their normal positions.

78. In a machine of the character described, a supply point for empty mandrels, a manipulating point, and a discharge point for full mandrels, a mandrel conveyor traversing said points and provided with mandrel-engaging means, and automatically operating devices at the supply point for said engaging means.

79. In a machine of the character described, a supply point for empty mandrels, a manipulating point, and a discharge point for full mandrels, a mandrel conveyor traversing said points and provided with mandrel-engaging means, and automatically operating devices at the discharge point for said engaging means.

80. In a machine of the character described, a conveyor, means for moving it, mandrel holding means on said conveyor, and means for actuating said holders while said conveyor is in motion to cause them to engage empty mandrels.

81. In a machine of the character described, a conveyor, means for moving it, mandrel holding means on said conveyor, and automatically operated means for actuating said holders while said conveyor is in motion to cause them to engage empty mandrels.

82. In a machine of the character described, a conveyor, means for moving it, mandrel holding means on said conveyor, and means for actuating said holders while said conveyor is in motion to cause them to disengage empty mandrels.

83. In a machine of the character described, a conveyor, means for moving it, mandrel holding means on said conveyor, and automatically operated means for actuating said holders while said conveyor is in motion to cause them to disengage empty mandrels.

84. In a machine of the character described, a track at each end of the machine, each track comprising an upper large loop and a lower small loop offset therefrom, front and rear connecting portions between the corresponding ends of said loops, a discharge point at the front portion of each track, a supply point and a manipulating point at the lower side of the enlarged upper loop, mandrel conveying members supported and guided by said tracks to traverse said points, and mandrels positioned between and supported at their ends by said conveyor members.

85. In a machine of the character described, a conveyor, mandrel holding means thereon, and mandrels supported on said holding means but movable relatively thereto, otherwise than rotatably, while so supported.

86. In a machine of the character described, a track member at each end of the machine, an endless groove in each track, endless conveyor members in said grooves, mandrel holding means carried thereby, a second endless groove in each track, said mandrel holding devices projecting into the last mentioned grooves, and means in said grooves for operating said mandrel holding devices.

87. In a machine of the character described, mandrel conveying means, driving means therefor, a shaft on which said driving means is mounted, a reciprocating device, and connections between said shaft and said reciprocating device effective during the movement of the latter in one direction to move said shaft.

88. In a machine of the character described, a mandrel conveyor provided with mandrel engaging devices, and means for automatically operating said devices periodically.

89. In a machine of the character described, mandrels provided with apertured ends, mandrel-conveyor members, alined mandrel-engaging means mounted on said members and adapted to fit within the apertured ends of the mandrels, and stops to limit the end-wise movement of the mandrels while supported by said means.

90. In a machine of the character described, a web former, squeeze rolls, and a web breaker located between said former and squeeze rolls.

91. In a machine of the character described, a mandrel, a base roll and a press roll between which said mandrel is positioned, and means for removing excess water expressed from the web during the winding operation.

92. In a machine of the character described, a base roll, a mandrel, a press roll, and means positioned adjacent the point of contact of said mandrel and press roll for removing excess water expressed from the web during the winding operation.

93. In a machine for winding a web of pulp onto a mandrel, a base roll and a press roll between which said mandrel is positioned, and means located above said base roll for removing excess water expressed during the winding operation.

94. In a machine for winding a web of pulp onto a mandrel, a base roll and a press roll between which said mandrel is positioned, and means located between the mandrel and press roll for removing excess water.

95. In a machine for winding a web of pulp onto a mandrel, a base roll and a press roll between which said mandrel is positioned, and traveling means located between the mandrel and press roll for removing excess water.

96. In a machine of the character described, a pair of oppositely arranged conveyor members, means for causing them to move together, alined mandrel-holders carried thereby, means for moving said holders out of engaging position, mechanism for moving a mandrel to position it between a pair of holders while they are out of engaging position, and means for releasing said holders while the path of travel of the mandrel and holders is coincident to permit the latter to engage a mandrel.

97. In a machine of the character described, an endless chain conveyor, and oppositely arranged cooperating mandrel supporting means pivotally carried thereby.

98. In a machine of the character described, a pair of oppositely arranged endless conveyor chains, means for driving them together, pivoted supports carried by said chains and arranged at intervals therealong in pairs opposite one another, mandrel-holders mounted on said pivoted supports, and means for continuously guiding said supports.

99. In a machine of the character described, a pair of oppositely arranged endless conveyor chains, guiding means therefor, means for driving them together, rods arranged between and connected at their ends to said conveyor chains, mandrel-holders pivotally mounted on said rods, and means for continuously guiding said holders.

100. In a machine of the character described, a press roll, lifting means therefor, and automatically operating means to permit the movement of said roll relative to said lifting means in both of its extreme positions.

101. In a machine of the character described, web feeding means, web winding mechanism including a base roll and a press roll, a mandrel therebetween, said press roll being movable during the winding operation to accommodate the increase of thickness in the wall formed on said mandrel, and means actuated by said press roll when it has reached a predetermined position for lifting said press roll.

102. In a machine of the character described, web feeding means, a base roll, a press roll, a mandrel located therebetween and upon which winding takes place, lifting means for said press roll to permit removal of the mandrel after the winding operation is finished, said press roll being movable independently of said lifting means during the winding operation, and means actuated by the movement of said press roll when it has reached a predetermined position for operating said lifting means.

103. In a machine of the character described, web feeding means, a press roll, a base roll, a continuously rotating drive shaft, a member adapted for periodic engagement therewith, lifting means for said press roll connected with and operated by said member, said press roll being movable independently of said lifting means during the winding operation, means for establishing engagement between said driving shaft and member, and means actuated by the movement of said press roll when it has reached a predetermined position for operating said engaging means.

104. In a machine of the character described, web feeding means, a press roll, a base roll, lifting means for raising said press roll when the winding operation is completed, means for operating said lifting means, adjustable tripping mechanism controlling said operating means, and means actuated by the movement of said press roll when it has reached a predetermined position for operating said tripping mechanism.

105. In a machine of the character described, web winding mechanism including a base roll and a press roll, a mandrel located therebetween, means for supporting and conveying mandrels to and from the winding position between said base roll and press roll, said press roll being movable during the winding operation to accommodate an increase of thickness in the wall formed on the mandrel and means actuated by said press roll when it has reached a predetermined position for moving said conveying means.

106. In a machine of the character described, a press roll, a base roll, a mandrel conveyor, a continuously rotating shaft, a member adapted for periodic engagement therewith, driving means for said conveyor connected with and operated by said member, said press roll being movable during the winding operation, and means actuated by said press roll when it has reached a predetermined position during the winding operation for establishing engagement between said continuously operating shaft and member.

107. In a machine of the character described, a base roll, a press roll, a mandrel located therebetween upon which the winding takes place, mandrel conveying means, driving means therefor, lifting means for said press roll to permit the removal of the mandrel after the winding operation is finished, said press roll being movable during the winding operation to accommodate the increase of thickness in the wall formed on the mandrel and means actuated by said press roll when it has reached a predetermined position for operating said lifting means and said driving means.

108. In a machine of the character described, a press roll and means for lifting the same, a base roll, mandrel conveying means and driving means therefor, a member connected with said lifting means and said driving means, a driver for said member, said press roll being movable during the winding operation to accommodate the increase of thickness of the wall formed on the mandrel, and means actuated by the movement of said press roll when it has reached a predetermined position for periodically connecting said member with said driver.

109. In a machine of the character described, a press roll, a base roll, lifting means for raising the press after the winding is finished, mandrel conveying means, driving means therefor, means for operating said lifting means and driving means, adjustable tripping mechanism controlling said operating means, and means actuated by the movement of said press roll when it has reached a predetermined position during the winding operation for operating said tripping mechanism.

110. In a machine of the character described, a web conveyor, web winding mechanism including a base roll and a press roll, a mandrel therebetween, a web breaker a continuously rotating member, controlling means for said breaker adapted for periodic engagement with said member, means for periodically engaging said controlling means with said member, said press roll being movable during the winding operation to accommodate the increase of thickness in the wall formed on the mandrel, and means actuated by the movement of said press roll when it reaches a predetermined position for releasing said engaging means.

111. In a machine of the character described, a web conveyor, web winding mechanism including a base roll and a press roll, the latter being movable during the winding operation to accommodate the increased thickness in the wall of the article being formed, a web breaker, a continuously driven member, a cam to control the movement of said web breaker, means for periodically engaging said cam with said member, adjustable tripping mechanism for said engaging means and actuated by said press 112. In a machine of the character described, web conveying, web winding and web breaker mechanisms, a press roll forming a part of said winding mechanism and movable during the winding operation to accommodate the increased thickness in the wall of the article being formed, means for lifting said press roll after the winding is completed, and mechanism actuated by said press roll when it reaches a predetermined position for operating said lifting means and web breaker mechanism.

113. In a machine of the character described, manipulating mechanism including a base roll and a press roll, a web conveyor, a web breaker, said press roll being movable during the winding operation to accommodate an increased thickness in the wall of the article being formed, controlling means actuated by said press roll when it reaches a predetermined point for periodically operating said web breaker, and lifting means for said press roll actuated by said controlling means.

114. In a machine of the character described, web manipulating mechanism including a press roll movable during the manipulating operation, a mandrel upon which the web is wound, mandrel conveying means, driving means therefor, web breaking mechanism, and mechanism actuated by said press roll when it reaches a predetermined position for operating said driving means and web breaking means.

115. In a machine of the character described, web winding mechanism including a press roll movable during the winding operation to accommodate an increase of thickness in the wall of the article formed, a web conveyor, a mandrel onto which the web is wound, mandrel conveying means, a web breaker, means actuated by said press roll when it reaches a predetermined position for periodically operating said web breaker, and means actuated by said last mentioned means for periodically driving said conveyor.

116. In a machine of the character described, web conveying, web winding and web breaking mechanisms, a press roll forming a part of the winding mechanism and movable during the winding operation, means for lifting the same after the winding operation is finished, mandrel conveying means, driving means therefor, and mechanism actuated by the movement of said press roll when it reaches a predetermined position for periodically operating said web breaking mechanism, lifting means and driving means.

117. In a machine of the character described, web winding mechanism including a press roll movable during the winding operation to accommodate an increase of thickness in the wall of the article formed, means for lifting the press roll after the winding operation is completed, a mandrel onto which the web is wound, mandrel conveying means, driving means therefor, a web conveyor, a web breaker, means actuated by said press roll when it reaches a predetermined position for periodically operating said web breaker, and means actuated by said last mentioned means for operating said lifting means and driving means.

118. In a machine of the character described, a base roll, a press roll, a web conveyor, a web breaker, means for periodically actuating said breaker, and lifting means for said press roll actuated after said web is broken and the winding is completed.

119. In a machine of the character described, web winding mechanism including a base roll and a press roll, a mandrel therebetween, a web conveyor, a web breaker, means controlled by the amount of web wound on said mandrel for periodically actuating said web breaker, and lifting means for said press roll actuated after the web is broken and the winding is completed.

120. In a machine of the character described, web manipulating mechanism including a base roll and a press roll, a web conveyor, a web breaker, means controlled by the amount of web supplied to said manipulating mechanism for actuating said breaker periodically to move it into contact with said web, and lifting means for said press roll controlled by the amount of web supplied and actuated after the web is broken.

121. In a machine of the character described, web conveying, web winding and web breaking mechanisms, a mandrel on which winding takes place, a press roll forming a part of the winding mechanism and movable during the winding operation to accommodate the increase of thickness in the wall of the article formed on said mandrel, and lifting means for said press roll actuated after the web is broken, said lifting means and web breaking mechanism being controlled by said press roll when it reaches a predetermined position.

122. In a machine of the character described, web manipulating mechanism including a base roll and a press roll, a web conveyor, a web breaker, automatically operated means for periodically actuating said web breaker, and lifting means for said press roll controlled by said operating means and actuated after the web is broken.

123. In a machine of the character described, web winding, web conveying and web breaking mechanisms, a mandrel upon which winding takes place, a press roll forming a part of said winding mechanism and movable during the winding operation to accommodate an increase of thickness in the wall formed on the mandrel, controlling means for said web breaking mechanism actuated by said press roll when it reaches a predetermined position, and lifting means for said press roll actuated by said controlling means after the web is broken.

124. In a machine of the character described, web manipulating mechanism, a web conveyor, a web breaker, movable mandrel conveying means, means for periodically actuating said breaker, and driving means for said mandrel conveying means actuated after the web is broken.

125. In a machine of the character described, web manipulating mechanism, a web conveyor, a web breaker, movable mandrel conveying means, means controlled by the amount of web supplied to the manipulating mechanism for periodically actuating said web breaker, and driving means for said mandrel conveying means actuated after the web is broken.

126. In a machine of the character described, web manipulating mechanism, a web conveyor, a web breaker, movable mandrel conveying means, means controlled by the amount of web supplied to the manipulating mechanism for periodically actuating said web breaker, and driving means for moving said conveyor controlled by the amount of web manipulated and actuated after the web is broken.

127. In a machine of the character described, web winding mechanism, a web conveyor, a web breaker, movable mandrel conveying means, automatically operated means for periodically actuating said web conveyor, and driving means for said conveyor controlled by said automatically operated means and actuated after the web is broken.

128. In a machine of the character described, web manipulating mechanism, a web conveyor, a web breaker, movable mandrel conveying means, automatically operated means controlled by the amount of web supplied to said manipulating mechanism for periodically actuating said breaker, and driving means for said mandrel conveying means controlled by said automatically operated means and actuated after the web is broken.

129. In a machine of the character described, a base roll, a press roll, a web conveyor, a web breaker, mandrel conveying mechanism, means for operating said web breaker, means for periodically lifting the press roll after the web is broken, means for periodically moving the mandrel conveying mechanism while the press roll is raised, and mechanism actuated by said operating means for releasing said lifting means and driving means.

130. In a machine of the character described, web manipulating mechanism, a web conveyor, a web breaker and controlling means therefor, automatically operated means for periodically actuating said breaker, a press roll forming a part of the manipulating mechanism, lifting means for raising and holding said press roll in raised position, a driver for said lifting means, and means actuated by said controlling mechanism for periodically connecting said driver with said lifting means.

131. In a machine of the character described, a web conveyor, a web breaker, controlling means therefor, automatically operated means for periodically actuating said web breaker, mandrel conveying means, operating mechanism therefor, a driver for said operating mechanism, and means actuated by said controlling mechanism for periodically connecting said driver with said operating mechanism.

132. In a machine of the character described, web conveying, web winding and web breaking mechanisms, a mandrel conveyor, driving means therefor, means for periodically operating said driving means, and means actuated by said web breaking mechanism for releasing said operating means.

133. In a machine of the character described, a web conveyor, a web breaker, intermittently rotatable controlling means therefor, mandrel conveying means, intermittently actuated driving mechanism therefor, a constantly driven member for said controlling means, a constantly driven member for said driving means, automatically operated means for connecting said controlling means to its constantly driven member, and means controlled by said automatically operated means for connecting said driving means to its constantly driven member.

134. In a machine of the character described, web conveying, web winding and web breaking mechanisms, a press roll forming a part of the winding mechanism, a mandrel onto which the web is wound, lifting means for said press roll, and means controlled by the amount of web wound onto said mandrel for periodically operating said web breaking mechanism and lifting means.

135. In a machine of the character described, web conveying, web winding and web breaking mechanisms, means for actuating said web breaking mechanism, mandrel conveying means and driving means therefor, a press roll and means for lifting the same, and means controlled by said actuating means for releasing said driving means and lifting means.

136. In a machine of the character described, a press roll, lifting means therefor, and a connection between said press roll and lifting means including a dash pot arranged to permit downward movement of said press roll to a limited extent relative to said lifting means after the latter has been operated.

137. In a machine of the character described, manipulating mechanism, a web conveyor, a rotatable breaker roll, and means for periodically moving said roll into contact with the web on said conveyor.

HOWARD PARKER.

Witnesses:
E. F. BAILEY,
ARTHUR TROTTIER.